US007165421B2

(12) United States Patent
Tsugawa

(10) Patent No.: US 7,165,421 B2
(45) Date of Patent: Jan. 23, 2007

(54) REFRIGERATION SYSTEM

(75) Inventor: Tokumi Tsugawa, Tokyo (JP)

(73) Assignee: TGK Co., Ltd., Hachioji (JP)

( * ) Notice: Subject to any disclaimer, the term of this patent is extended or adjusted under 35 U.S.C. 154(b) by 155 days.

(21) Appl. No.: 11/097,350

(22) Filed: Apr. 4, 2005

(65) Prior Publication Data

US 2005/0217313 A1    Oct. 6, 2005

(30) Foreign Application Priority Data

Apr. 6, 2004  (JP) ............................. 2004-111693

(51) Int. Cl.
*F25B 41/06* (2006.01)
(52) U.S. Cl. ...................................... 62/527
(58) Field of Classification Search .............. 62/149, 62/126, 222, 224, 225, 244, 527; 236/92 B
See application file for complete search history.

(56) References Cited

U.S. PATENT DOCUMENTS

| | | | | |
|---|---|---|---|---|
| 4,711,096 | A | * | 12/1987 | Krantz .......................... 62/129 |
| 5,564,280 | A | * | 10/1996 | Schilling et al. ................ 62/84 |
| 5,946,939 | A | * | 9/1999 | Matsushima et al. .......... 62/507 |
| 5,979,173 | A | * | 11/1999 | Tyree ............................ 62/388 |
| 5,983,657 | A | * | 11/1999 | Murata et al. ............... 62/228.3 |
| 6,085,531 | A | * | 7/2000 | Numoto et al. ................ 62/149 |
| 6,766,654 | B2 | * | 7/2004 | Straub ........................... 62/244 |
| 2004/0003624 | A1 | | 1/2004 | Kadle et al. |

FOREIGN PATENT DOCUMENTS

| | | |
|---|---|---|
| DE | 102 41 367 A1 | 3/2004 |
| EP | 1 029 724 A2 | 8/2000 |
| EP | 1 040 947 A2 | 10/2000 |
| EP | 1 435 494 A1 | 7/2004 |
| JP | 2002147898 | 5/2002 |
| WO | WO 97/11324 A1 * | 3/1997 |

OTHER PUBLICATIONS

Patent Abstracts of Japan, Publication No. 2002-147898, dated May 22, 2002.
Patent Abstracts of Japan, Publication No. 2004-183957, dated Jul. 2, 2004.

* cited by examiner

*Primary Examiner*—Mohammad M. Ali
(74) *Attorney, Agent, or Firm*—Westerman, Hattori, Daniels & Adrian, LLP.

(57) ABSTRACT

To prevent refrigerant in a refrigeration cycle from releasing into a vehicle compartment, in large amounts, due to breakage of an evaporator disposed on a compartment side or piping thereto. An expansion device is formed by an expansion valve that supplies throttled and expanded refrigerant to an evaporator, an electromagnetic valve connected in series to the expansion valve, and a check valve that prevents backflow of refrigerant flowing out of the evaporator, and a release-to-atmosphere device is provided in low-pressure piping connected to the compressor, for allowing the refrigerant therein to be released into the atmosphere. As a result, when refrigerant in the evaporator has released, or when there is a possibility of refrigerant releasing from the same, the electromagnetic valve is closed to isolate the evaporator from high-pressure piping of the refrigeration cycle, and at the same time the release-to-atmosphere device is opened to thereby dispose of the refrigerant in the low-pressure piping, outside the vehicle compartment. As a result, safety of occupants is ensured.

5 Claims, 4 Drawing Sheets

REFRIGERATION SYSTEM

CROSS-REFERENCES TO RELATED APPLICATIONS, IF ANY

This application claims priority of Japanese Application No. 2004-111693 filed on Apr. 6, 2004 and entitled "REFRIGERATION SYSTEM".

BACKGROUND OF THE INVENTION (1) Field of the Invention

The present invention relates to a refrigeration system used in an automotive air conditioner using a gas harmful to a human body as refrigerant.

(2) Description of the Related Art

A typical refrigeration system used in automotive air conditioners comprises a compressor that compresses refrigerant circulating through a refrigeration cycle, a condenser that condenses the compressed refrigerant, a receiver/dryer that separates the condensed refrigerant into a gas and a liquid while temporarily storing the refrigerant circulating through the refrigeration cycle, an expansion device that throttles and expands liquid refrigerant obtained by gas/liquid separation, and an evaporator that evaporates the expanded refrigerant to return the same to the compressor (see e.g. Japanese Unexamined Patent Publication (Kokai) No. 2002-147898 (Paragraph number [0011], and FIG. 1)).

Although in the refrigeration cycle for an automotive air conditioner, a CFC substitute (HFC-134a) has been used as refrigerant, the use of refrigerant with a small global warming potential has come to be demanded in view of global warming. As such a refrigerant; there are considered e.g. carbon dioxide, HFC-152a, butane, and propane.

However, for example, when carbon dioxide is used as refrigerant for an automotive air conditioner, in case an evaporator disposed in a space leading to a vehicle compartment or piping disposed in the vehicle compartment is broken or cracked due to aging to cause release of refrigerant into the vehicle compartment, there is a danger of suffocation of vehicle occupants due to oxygen deficiency, whereas when an inflammable gas, such as HFC-152a, is used as refrigerant, in case of the above-mentioned event, there is a possibility of the inflammable gas catching a fire to set the vehicle on fire, causing serious influence on the vehicle occupants.

SUMMARY OF THE INVENTION

The present invention has been made in view of such problems, and an object thereof is to provide a refrigeration system which is capable of preventing refrigerant in the refrigeration cycle from releasing into a vehicle compartment, e.g. when an evaporator or piping disposed on the compartment side is broken.

As a solution to the above-described problems, the present invention provides a refrigeration system constructed by arranging an evaporator in a space leading to an inside of a vehicle compartment, comprising an expansion device including an opening and closing section that is electrically operated for opening and closing a first refrigerant passage leading to an inlet of the evaporator, and a backflow-preventing section provided in a second refrigerant passage that allows refrigerant flowing from the evaporator to pass therethrough, for preventing refrigerant being sucked by a compressor when the refrigeration system stops operating from flowing back to the evaporator when the refrigeration system is in stoppage, the expansion device controlling a flow rate of refrigerant flowing through the first refrigerant passage according to temperature and pressure of refrigerant in the second refrigerant passage and a release-to-atmosphere device that is disposed in piping on a suction side of the compressor, and electrically operated for allowing refrigerant in the piping on the suction side of the compressor to be released into the atmosphere.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereinafter, an embodiment of the present invention will be described in detail with reference to the drawings showing an example in which it is applied to an automotive air conditioner.

Figure 1:
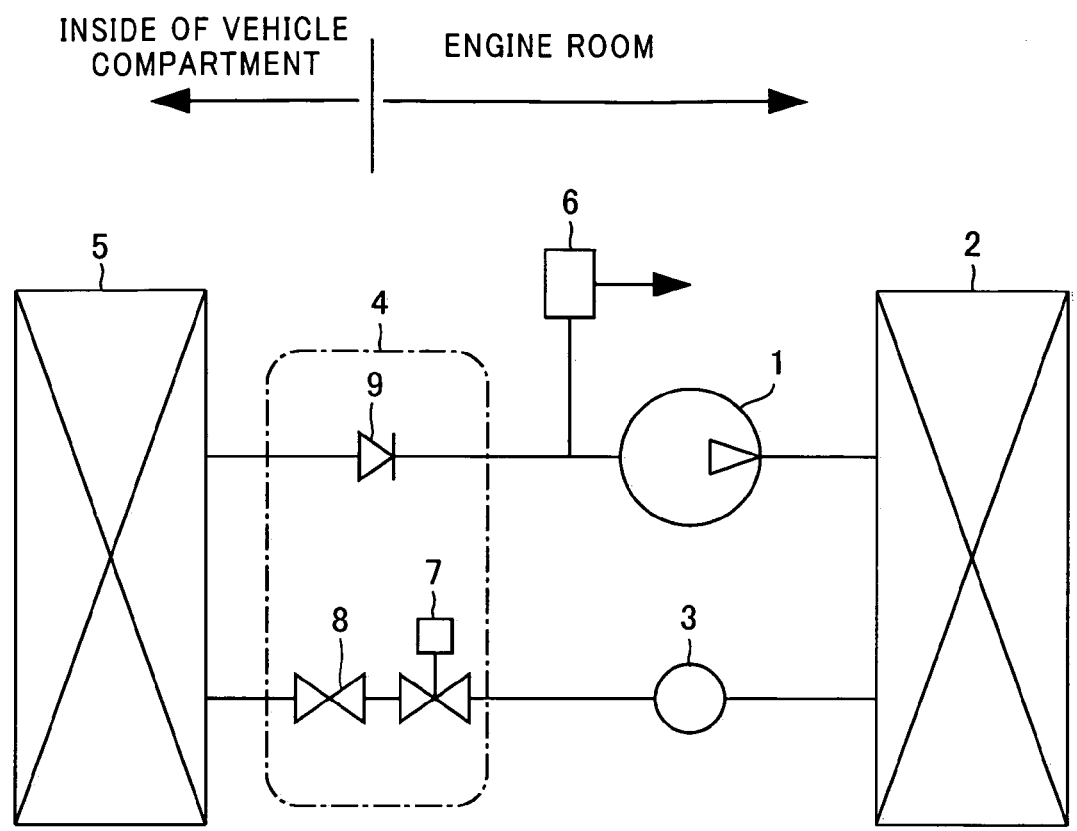
FIG. 1 is a block diagram showing the basic configuration of a refrigeration system according to the invention.

FIG. 1 is a block diagram showing a basic configuration of a refrigeration system according to the invention.

The refrigeration system comprises a compressor 1 that compresses refrigerant, a condenser 2 that condenses the compressed refrigerant, a receiver/dryer 3 that separates the condensed refrigerant into a gas and a liquid while temporarily storing the refrigerant circulating through the refrigeration cycle, an expansion device 4 that throttles and expands liquid refrigerant obtained by gas/liquid separation, and an evaporator 5 that evaporates the expanded refrigerant to return the same to the compressor, and a release-to-atmosphere device disposed in piping on the suction side of the compressor 1. The expansion device 4 comprises an electromagnetic valve 7 that opens and closes piping on the inlet side of the evaporator 5, an expansion valve 8 that throttles and expands liquid refrigerant, and a check valve 9 disposed in piping on the outlet side of the evaporator 5. The electromagnetic valve 7 forms an electrically-driven opening and closing section that opens when not energized and closes when energized, and the check valve 9 forms a backflow-preventing section that prevents backflow of refrigerant from the compressor 1 to the evaporator 5. The release-to-atmosphere device 6 holds itself in the state open to the atmosphere after being electrically operated. The compressor 1, the condenser 2, the receiver/dryer 3, and the release-to-atmosphere device 6 are arranged in an engine room of an automotive vehicle, and the evaporator 5 is disposed in a space leading to the vehicle compartment. The expansion device 4 is disposed at a partition wall separating between the compartment and the engine room.

In the refrigeration system constructed as above, when the automotive air conditioner is operated, first, the electromagnetic valve 7 of the expansion device 4 is fully opened. This causes the refrigeration system to operate as a refrigeration system conventionally constructed without the electromagnetic valve 7 and the check valve 9 in its refrigeration cycle. Therefore, the refrigerant compressed by the compressor 1 enters the receiver/dryer 3 after being condensed by the condenser 2, and is subjected to gas-liquid separation by the receiver/dryer 3. The liquid refrigerant obtained by the gas-liquid separation passes through the electromagnetic valve 7 to enter the expansion valve 8, where it is throttled and expanded to enter the evaporator 5. Then, after evaporating in the evaporator 5, the refrigerant passes through the check valve 9 to return to the compressor 1. In this process, during evaporation by exchanging heat with air in the compartment, the refrigerant takes latent heat of evaporation from air in the compartment to thereby cool the air in the compartment.

Next, when the automotive air conditioner stops operating, first, the electromagnetic valve 7 is closed to block a refrigerant passage between the receiver/dryer 3 and the expansion valve 8. This prevents the refrigerant sent under pressure from the compressor 1 from entering the expansion valve 8 and then the evaporator 5. When the compressor 1 has stopped and ceased to produce suction of refrigeration, and a blower stops blowing air to the evaporator 5 to stop evaporation of refrigerant in the evaporator 5, pressure in the evaporator 5 becomes lower than pressure on the suction side of the compressor 1. In such a case, the check valve 9 is closed to prevent refrigerant in the piping on the suction side of the compressor 1 from flowing back into the evaporator 5. This enables the evaporator 5 disposed on the compartment side to be isolated from the refrigeration cycle, whereby even if the evaporator 5 or the piping connected thereto should be broken by a crack due to aging or a rapture, it is possible to prevent all refrigerant in the refrigeration cycle from releasing into the compartment in large amounts.

Further, when the evaporator 5 is broken to allow the refrigerant to actually release or escape from the evaporator 5, or when the vehicle is placed in a circumstance under which the evaporator 5 can be broken to cause the possibility of refrigerant releasing or escaping into the compartment, the release-to-atmosphere device 6 is operated, and if the automotive air conditioner is in operation, energization of the electronic valve 7 is simultaneously stopped. This causes the electromagnetic valve 7 to close and stop the refrigerant from flowing to the evaporator 5 through high-pressure piping, and the release-to-atmosphere device 6 to open low-pressure piping on the suction side of the compressor 1 to the atmosphere to thereby release refrigerant in the refrigeration cycle into the atmosphere. Therefore, even when the evaporator 5 falls into a state in which it is broken or can be broken, high-pressure refrigerant is prevented from flowing from the evaporator 5 into the compartment, and refrigerant in the piping on the low-pressure side is also prevented from flowing from the evaporator 5 into the compartment. Therefore, there is no fear of vehicle occupants in the compartment being suffocated due to oxygen deficiency or the vehicle being set on fire by catching a fire.

Figure 2:
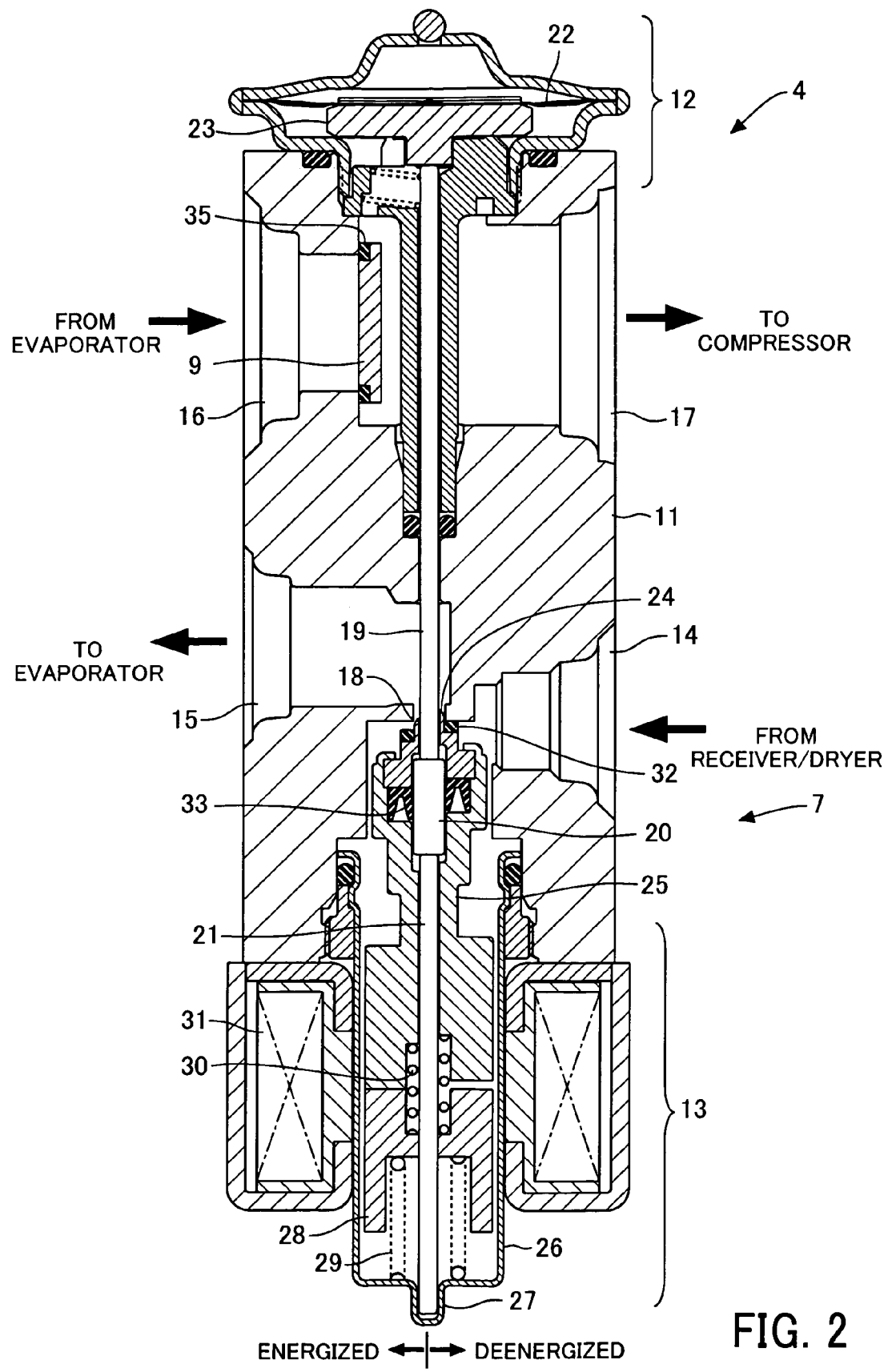
FIG. 2 is a central longitudinal cross-sectional view showing an example of the construction of an expansion device.

FIG. 2 is a central longitudinal cross-sectional view showing an example of the construction of the expansion device. In FIG. 2, to simultaneously show a state of the electromagnetic closing function of the expansion device for blocking the low-pressure refrigerant passage and a state of a function thereof as a conventional expansion device having its opening controlled, a right-hand side with respect to the center of FIG. 2 shows a valve element and movable parts of a solenoid in a valve-closed state during non-energization of the expansion device whereas a left-hand side with respect to the same shows them in a state operating as an expansion valve during energization of the expansion device.

The expansion device 4 comprises a body block 11 housing the electromagnetic valve 7 that forms the electrically-operated opening and closing section, and respective valve elements of the check valve 9 that forms the backflow-preventing section and the expansion valve 8, a power element 12 that senses temperature and pressure of refrigerant returning from the evaporator 5, and a solenoid 13 that switches the electromagnetic valve 7 between its electromagnetic closing function and its expansion valve function.

The body block 11 has a side formed with a port 14 for receiving high-temperature, high-pressure refrigerant from the condenser 2, a port 15 for supplying low-temperature, low-pressure refrigerant subjected to adiabatic expansion by the expansion device 4 to the evaporator 5, a port 16 for receiving refrigerant returned from the evaporator 5, and a port 17 for sending the refrigerant received through the port 16 to the compressor 1.

In a refrigerant passage (first refrigerant passage) communicating between the port 14 and the port 15, a valve seat 18 is integrally formed with the body block 11. Along the central axis of the body block 11, there are coaxially arranged a shaft 19 extending through a valve hole forming a valve seat 18, a valve element guide 20 having the same diameter as that of the valve hole, and a shaft 21 forming a drive shaft of the solenoid 13. An upper end of the shaft 19 is in abutment with a center disk 23 disposed on a lower side of a diaphragm 22 of the power element 12.

A dual-purpose valve element 24 extends through the valve seat 18 from an upstream side thereof such that it can be brought into contact with the valve seat 18 and out of contact therefrom by being guided along the shaft 19 and the valve element guide 20. With this configuration, a gap between the valve seat 18 and the dual-purpose valve element 24 forms a variable orifice for throttling high-pressure refrigerant, whereby refrigerant is throttled and expanded when passing through the variable orifice.

The dual-purpose valve element 24 is held on a first iron core 25 of the solenoid 13 serving as a movable iron core. The first iron core 25 is disposed in a manner axially movable forward and backward while being guided by a shaft 21 having a lower end thereof supported by a bearing 27 formed in an iron core case 26 of the solenoid 13. Below the first iron core 25, there is arranged a second iron core 28 that is secured to the shaft 21 to operate as a fixed iron core, and urged upward, as viewed in FIG. 2, by a spring 29. This spring 29 urges the shaft 19 such that the shaft 19 is in constant contact with the power element. Further, a spring 30 is interposed between the first iron core 25 and the second iron core 28. This spring 30 urges the first iron core 25 in a direction away from the second iron core 28 to thereby make it possible to maintain the fully-closed state of the valve seat 18, by causing the dual-purpose valve element 24 held by the first iron core 25 to be constantly seated on the valve seat 18. Outside the iron core case 26, there is arranged an electromagnetic coil 31. The electromagnetic coil 31 is energized to cause the first iron core 25 and the second iron core 28 to attract to each other, whereby the dual-purpose valve element 24 and the shaft 19 are electromagnetically coupled to transmit the displacement of the diaphragm 22 of the power element 12 to the dual-purpose valve element 24.

The dual-purpose valve element 24 has an annular valve sheet 32 provided at a portion thereof via which it is seated on the valve seat 18, whereby in the fully-closed, state caused by the urging force of the spring 30 when the solenoid 13 is deenergized, the valve sheet 32 seals between the dual-purpose valve element 24 and the valve seat 18, thereby making it possible to substantially fully stop the flow of high-pressure refrigerant. Further, a V packing 33 is disposed in a space formed between the dual-purpose valve element 24 and the first iron core 25, thereby preventing internal leakage in the fully-closed state in which high-pressure refrigerant introduced to the valve element guide 20 via a gap between the first iron core 25 and the shaft 21 flows downstream of the valve section through a gap between the dual-purpose valve element 24 and the valve element guide 20 and between the dual-purpose valve element 24 and the shaft 19.

Then, a check valve 9 is disposed in a low-pressure refrigerant passage between the port 16 that receives refrigerant returned from the evaporator 5 and the port 17 that returns the refrigerant to the compressor 1. In the illustrated example, the check valve 9 is disposed in a central refrigerant passage (second refrigerant passage) communicating with a chamber under the diaphragm 22 provided for the power element 12, for sensing the temperature and pressure of refrigerant. Although not shown, the check valve 9 is formed integrally with legs, not shown, which are guided in the valve-opening and closing directions by the inner wall of the refrigerant passage of the port 16, and at the same time urged by a spring, not shown, having a weak spring force in the valve-closing direction. The check valve 9 has a flexible annular valve sheet 35 provided at a portion via which it is seated, and when the pressure in the evaporator 5 becomes lower than the pressure on the suction side of the compressor 1, the check valve 9 closes, thereby making it possible to isolate the evaporator 5 from the compressor 1.

In the expansion device 4 constructed above, since the solenoid 13 is in the deenergized state when the air conditioner is in stoppage, and hence the first iron core 25 is urged by the spring 30 in a direction away from the second iron core 28, so that the dual-purpose valve element 24 held by the first iron core 25 is seated on the valve seat 18.

Next, during operation of the air conditioner, the solenoid 13 is energized. This causes the first iron core 25 and the second iron core 28 to be attracted to each other, so that the dual-purpose valve element 24 is indirectly fixed to the shaft 19 that transmits the displacement of the diaphragm 22. At this time, since the first iron core 25 is moved toward the second iron core 28, whereby the dual-purpose valve element 24 is moved away from the valve seat 18, so that high-temperature, high-pressure refrigerant supplied from the receiver/dryer 3 to the port 14 flows through the gap between the dual-purpose valve element 24 and the valve seat 18 into the port 15. During this process, the high-temperature, high-pressure refrigerant is throttled and expanded into low-temperature, low-pressure refrigerant, and the resulting refrigerant is supplied from the port 15 to the evaporator 5.

The evaporator 5 causes the refrigerant supplied from the expansion device 4 to evaporate by exchanging heat with air in the compartment, and returns the evaporated refrigerant to the expansion device 4. The refrigerant returned from the evaporator 5 is received by the port 16 of the expansion device 4, passes through the central refrigerant passage of the same, and is returned from the port 17 to the compressor 1. At this time, in the expansion device 4, the power element 12 senses the temperature and pressure of the refrigerant flowing from the evaporator 5, and transmits the displacement of the diaphragm 22 dependent on the temperature and pressure of the refrigerant to the dual-purpose valve element 24 via the shaft 19, the valve element guide 20, the shaft 21, and the first and second iron cores 25 and 28, to thereby control the flow rate of refrigerant.

Figure 3:
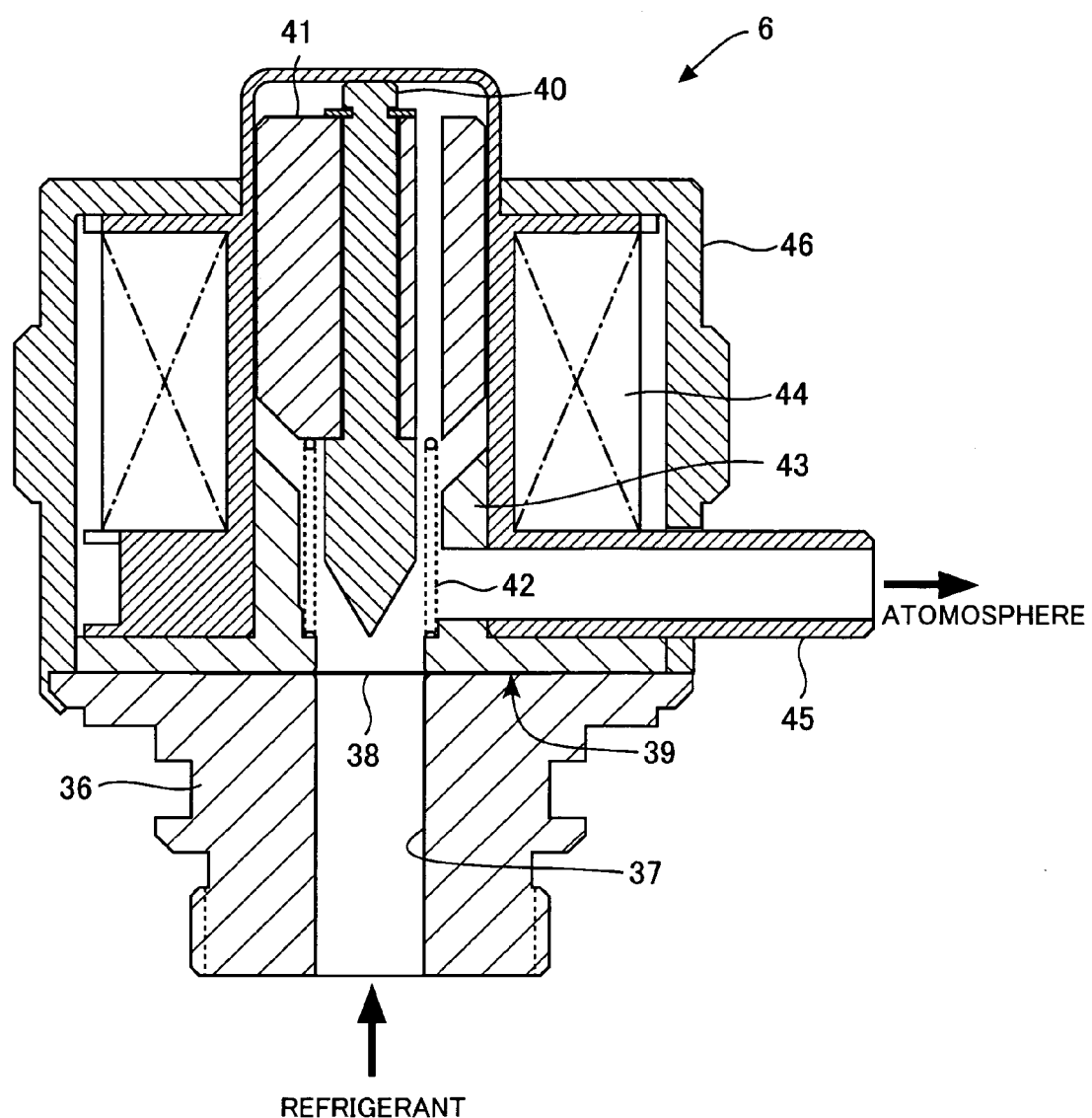
FIG. 3 is a central longitudinal cross-sectional view showing an example of the construction of a release-to-atmosphere device.

FIG. 3 is a central cross-sectional view showing an example of the construction of the release-to-atmosphere device.

The release-to-atmosphere device 6 includes a body 36 forming a joint for connection to low-pressure piping on the suction side of the compressor 1, and the body 36 has a refrigerant inlet passage 37 formed therethrough in the direction of a central axis thereof. The body 36 has a metal thin film 38 disposed on an upper surface thereof, as viewed in FIG. 3, in a manner blocking the refrigerant inlet passage 37. The metal thin film 38 is welded to the body 36 e.g. by laser welding along a concentric circle passing through a point 39 outward of the refrigerant inlet passage 37, whereby the metal thin film 38 is gastightly sealed to the body 36 along the whole circumference thereof.

Disposed above the body 36, as viewed in FIG. 3, is a solenoid forming a thin film-breaking section. More specifically, a piercing rod 40 is disposed in a manner movable forward and backward in a direction perpendicular to the surface of the metal thin film 38. This piercing rod 40 has a tip facing the metal thin film 38 formed such that it has a pointed shape, and is rigidly fixed to a movable core 41 of the solenoid. The movable core 41 is urged by a spring 42 in a direction away from a fixed core 43. The fixed core 43 has a hole axially formed therethrough for arranging the piercing rod 40 and the spring 42 therein. The fixed core 43 has a lower end, as viewed in FIG. 3, which is integrally formed with a flange portion protruding radially outward for forming a magnetic circuit, and further provided with a horizontal hole for permitting refrigerant to escape to the atmosphere.

Disposed around the outer peripheries of the movable core 41 and the fixed core 43 is a coil 44. A bobbin for the coil 44 has a container for containing the movable core 41 and the fixed core 43, and a conduit 45 for releasing refrigerant into the atmosphere, the container and the conduit 45 being integrally formed with the bobbin e.g. by a resin. This conduit 45 has a hose connected thereto, to thereby guide refrigerant to a suitable location for releasing refrigerant. Outside the coil 44, a yoke 46 for forming the magnetic circuit is disposed, and fixed to the body 36 by swaging.

First, when the release-to-atmosphere device 6 constructed above is on standby, electric current is not flowing through the coil 44, so that the movable core 41 is urged by the spring 42 in the direction away from the fixed core 43, to place the piercing rod 40 in a standby position where the tip thereof is away from the metal thin film 38.

Now, assuming that refrigerant has released into the compartment or there is a possibility of refrigerant flowing out into the compartment, pulse current e.g. is supplied to the coil 44, this causes the movable core 41 to be attracted by the fixed core 43 against the urging force of the spring 42. At this time, the tip of the piercing rod 40 formed at an acute angle breaks through the metal thin film 38, so that refrigerant in the refrigeration cycle is instantly released into the atmosphere via the conduit 45.

When pulse current ceases to be supplied to the coil 44, the movable core 41 is moved away from the fixed core 43 by the urging force of the spring 42, and the piercing rod 40 is pushed back by refrigerant blowing out from the broken metal thin film 38. After that, the release-to-atmosphere device 6 is held by itself in the state open to the atmosphere. This prevents the refrigerant in the refrigeration cycle from releasing into the vehicle compartment in large amounts, thereby making it possible to prevent a suffocation accident from being caused by the released refrigerant, or a firing accident from being caused by a fire caught by the released refrigerant.

Figure 4:
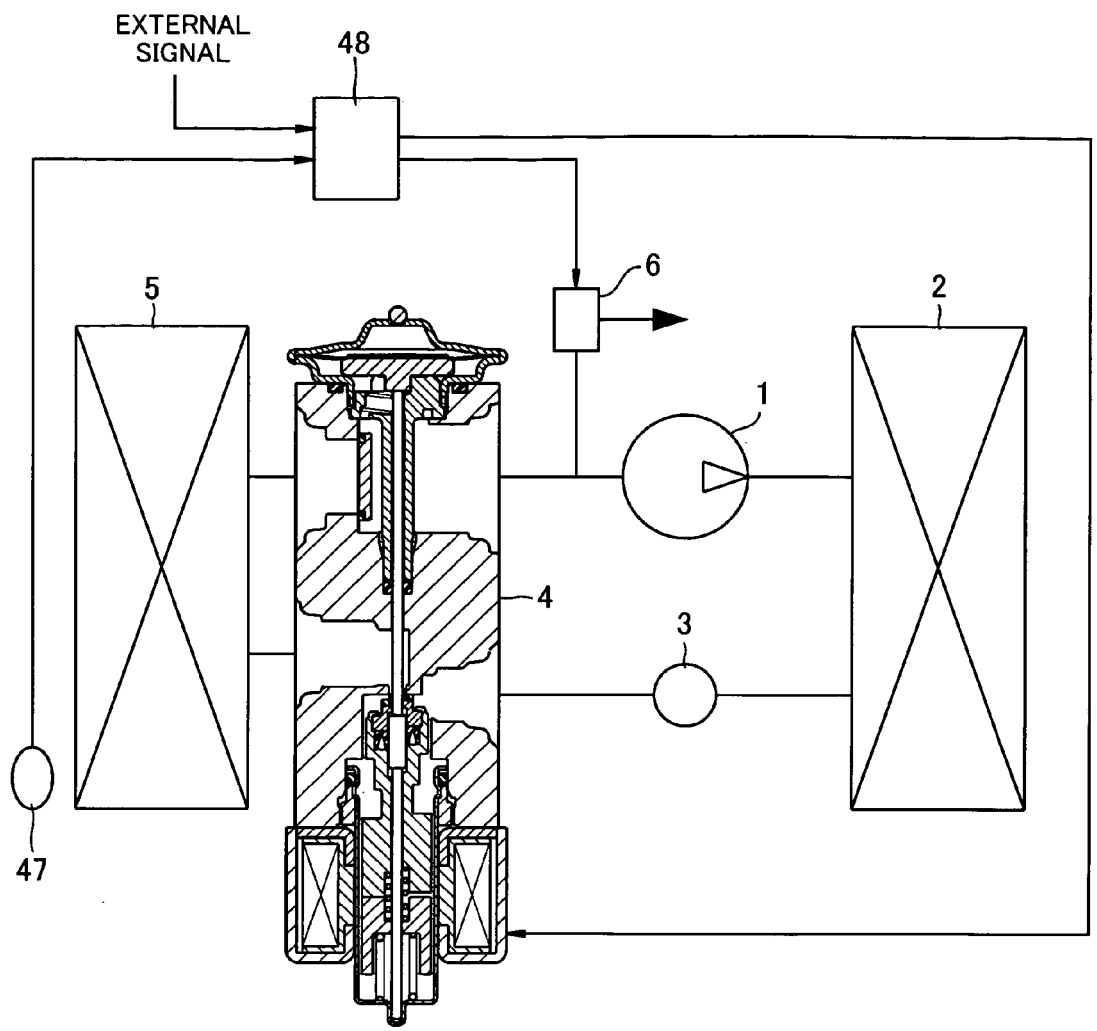
FIG. 4 is a system diagram showing the refrigeration system according to the invention.

FIG. 4 is a system diagram showing the refrigeration system according to the present invention.

According to this refrigeration system, a refrigerant sensor 47 is disposed in the vicinity of the evaporator 5, for detecting concentration of refrigerant in the compartment. The output of the refrigerant sensor 47 is connected to the input of the control device 48, and the output of the control device 48 is connected to the expansion device 4 and the release-to-atmosphere device 6. When carbon dioxide is used as refrigerant, the refrigerant sensor 47 is implemented by a sensor that detects carbon dioxide, whereas when HFC-152a is used, the same is implemented by a sensor that detects HFC-152a. However, in the case of the sensor that detects carbon dioxide, it is possible to distinguish an increase in the concentration of carbon dioxide caused by a large amount of refrigerant released in a short time period from that caused by breathing of vehicle occupants, by not only simply detecting the concentration of carbon dioxide, but also by detecting a rate of increase in the concentration of carbon dioxide. Further, the control device 48 is configured to be capable of receiving an external signal. The external signal is output when a computer mounted on the vehicle detects that the vehicle has fallen into a state in which the evaporator 5 can be seriously damaged.

With the above construction, when the refrigerant sensor 47 detects an actual release of refrigerant from the evaporator 5, the control device 48, responsive to the detection signal, causes the expansion device 4 and the release-to-atmosphere device 6 to operate. That is, when the air conditioner is in stoppage, the control device 48 does not do anything to the expansion device 4, but when the same is in operation, the control device 48 turns off the power of the electromagnetic valve 7 to block the high-pressure piping to thereby isolate the evaporator 5 from the high-pressure piping. The control device 48 supplies pulse current to the release-to-atmosphere device 6 to cause the solenoid thereof to operate, whereby the metal thin film 38 is broken to allow refrigerant in the low-pressure piping to be released into the atmosphere outside the vehicle compartment. Of course, when the external signal indicative of abnormality of the vehicle is input from the other computer mounted on the vehicle, the electromagnetic valve 7 is similarly closed, and the release-to-atmosphere device 6 is opened to the atmosphere.

The refrigeration system according to the present invention uses a normally-closed electromagnetic valve for the opening and closing section of an expansion device, and therefore, even in cases where the power supply from a battery is cut off when the vehicle falls into a state where the evaporator can be broken, it is possible to positively isolate the evaporator from the high-pressure piping. Further, the release-to-atmosphere device is capable of holding itself in the state open to the atmosphere even in the deenergized state thereof after being electrically operated to be made open to the atmosphere. This makes it possible to positively cause the refrigerant in the low-pressure piping to be released into the atmosphere even after the power supply thereto is cut off.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A refrigeration system constructed by arranging an evaporator in a space leading to an inside of a vehicle compartment, comprising:

an expansion device including an opening and closing section that is electrically operated for opening and closing a first refrigerant passage leading to an inlet of the evaporator, and a backflow-preventing section provided in a second refrigerant passage that allows refrigerant flowing from the evaporator to pass therethrough, for preventing refrigerant being sucked by a compressor when the refrigeration system stops operating from flowing back to the evaporator when the refrigeration system is in stoppage, the expansion device controlling a flow rate of refrigerant flowing through the first refrigerant passage according to temperature and pressure of refrigerant in the second refrigerant passage; and a release-to-atmosphere device that is disposed in piping on a suction side of the compressor, and electrically operated for allowing refrigerant in the piping on the suction side of the compressor to be released into the atmosphere.

2. The refrigeration system according to claim 1, wherein the opening and closing section of the expansion device is a normally-closed electromagnetic valve that blocks the first refrigerant passage when the refrigeration system stops operating and is in stoppage.

3. The refrigeration system according to claim 2, wherein the expansion device comprises a power element that senses the temperature and pressure of refrigerant in the second refrigerant passage, a shaft that transmits displacement of the power element, and a dual-purpose valve element that is guided by the shaft and axially movable forward and backward, for opening and closing the first refrigerant passage and controlling the flow rate of refrigerant flowing through the first refrigerant passage according to the displacement of the power element, the dual-purpose valve element being shared for use between the expansion device and the opening and closing section, and a first iron core and a second iron core that are urged in a valve-closing direction of the dual-purpose valve element when the opening and closing section is not energized, and electromagnetically coupled when the opening and closing section is energized to transmit motion of the shaft to the dual-purpose valve element.

4. The refrigeration system according to claim 1, wherein after being electrically operated to release the refrigerant to the atmosphere, and the release-to-atmosphere device holds itself in a state open to the atmosphere even in a deenergized state thereof.

5. The refrigeration system according to claim 1, further comprising a refrigerant sensor that detects concentration of refrigerant in the vehicle compartment, and a control device that causes the opening and closing section of the expansion device and the release-to-atmosphere device to be operated based on at least a detection signal output from the refrigerant sensor.

* * * * *